United States Patent [19]
Taomo et al.

[11] Patent Number: 5,871,202
[45] Date of Patent: Feb. 16, 1999

[54] HAND LEVER APPARATUS HAVING A TOGGLE MECHANISM

[75] Inventors: Toshio Taomo, Tokyo; Hisato Ohsawa, Hamura; Hirofumi Yamami, Akishima; Fumihiko Aiyama, Musashimurayama, all of Japan

[73] Assignee: Kioritz Corporation, Tokyo, Japan

[21] Appl. No.: 665,551

[22] Filed: Jun. 18, 1996

[30] Foreign Application Priority Data

Jun. 22, 1995 [JP] Japan .................................. 7-156006

[51] Int. Cl.⁶ .............................. F16K 31/46; F16C 1/10; F02D 11/02
[52] U.S. Cl. ...................... 251/294; 74/106; 74/501.6; 123/400
[58] Field of Search .................... 123/398, 400; 74/501.6, 106, 516; 251/294

[56] References Cited

U.S. PATENT DOCUMENTS

| | | | |
|---|---|---|---|
| 2,531,740 | 11/1950 | Orscheln | 74/501.6 X |
| 2,949,037 | 8/1960 | Knappe | 74/106 |
| 3,912,251 | 10/1975 | Fraser et al. | 74/106 X |
| 4,292,858 | 10/1981 | Lipshield | 74/501.6 |
| 4,798,185 | 1/1989 | Driggers | 123/400 |
| 5,065,643 | 11/1991 | Axtell | 74/501.6 |
| 5,462,254 | 10/1995 | Muller | 251/294 |

FOREIGN PATENT DOCUMENTS 43 13612  10/1994  Germany .

*Primary Examiner*—John Rivell
*Attorney, Agent, or Firm*—Pillsbury Madison & Sutro LLP

[57] ABSTRACT

A hand lever apparatus (throttle lever) (10) is provided which has an automatic restoring function (automatic idle rotation opening position restoring function) to cope with an accident and which can perform normal operation lightly and swiftly. The hand lever apparatus (10) has a rotationally operable operating lever (30) and a toggle mechanism (T). The operating lever (30) is operated to actuate, through the toggle mechanism (T), a cable (20) connected to a driven member (CV) so as to pull the cable (20).

3 Claims, 4 Drawing Sheets

HAND LEVER APPARATUS HAVING A TOGGLE MECHANISM

BACKGROUND OF THE INVENTION

1. Field of the Invention

The present invention relates to hand lever apparatus for operating a driven member such as a throttle valve of an internal combustion engine through a cable and more particularly, to a hand lever apparatus arranged near a grip portion of a handle of a work machine such as a grass trimmer or a hedge trimmer and suited for operating the throttle valve through a throttle cable or the like.

2. Description of the Prior Art

Conventionally, in a work machine such as a grass trimmer or a hedge trimmer in which a working unit including of a cutter is generally driven by an internal combustion engine and which has the aim of adjusting the output of the driving internal combustion engine by hand, a hand lever apparatus for adjusting of the opening of a throttle valve of the internal combustion engine is arranged near a grip portion of a U-shaped handle or a bar handle provided for the work machine.

The hand lever apparatus has a throttle trigger (throttle lever) typically operated by fingers of an operator. By rotationally operating the throttle lever, the opening of the throttle valve can be adjusted through the throttle cable. The throttle valve is normally biased to a minimum opening (idle rotation opening) so that the idle rotation opening may be maintained under the intact condition in which the throttle lever is not operated. When the throttle lever is operated to pull the throttle cable by a predetermined length or more to cancel out a play, the opening may be increased from the idle rotation opening to an opening for a high-speed rotation.

Two types of throttle lever apparatuses for adjusting of the opening of the throttle valve are generally known. Which is an automatic idle rotation opening restoring type in which when the throttle lever is released from the rotationally operated state, the lever together with the throttle valve is automatically returned to the intact position (idle rotation opening). The other is an idle opening non-restoring type in which when the operator's fingers merely removed from the throttle lever, the throttle lever is not moved but can be constantly maintained at a desired rotationally operated position (see, e.g., Japanese Utility Model Publication No. 57-19944).

In the automatic idle rotation opening restoring type, when the operator's fingers are removed from the throttle lever during operation of the work machine driven by the internal combustion engine, the internal combustion engine automatically returns to the idling state and in the case where the work machine transmits power from the internal combustion engine to a working unit including of a cutter through a centrifugal clutch, the centrifugal clutch is cut off under the idling state to interrupt power transmission to the working unit. Accordingly, in the event that an accident occurs during the operation of the work machine and power transmission to the working unit comprised of the cutter is required to be interrupted, the throttle valve can be returned immediately to the idle rotation opening by only releasing fingers from the throttle lever and driving of the working unit can be stopped. Therefore, from the standpoint of safety during operation, the automatic idle rotation opening restoring type is superior to the idle opening non-restoring type.

In the automatic idle rotation opening restoring type, an, automatic return to the idling state can be ensured by releasing the operator's fingers from the throttle lever. However, a desired rotationally operated position must be maintained by the operator's constantly holding or gripping the throttle lever by fingers.

The throttle cable connecting the throttle valve and the throttle lever is tortuous in many directions on the way to the throttle lever from the throttle valve. Moreover a return spring of the throttle valve is required to have a certain force enough to steadily return the throttle valve. Accordingly, in order to maintain a desired rotationally operated position by holding the throttle lever by the operator's fingers during operation of the work machine, an operation force for opposing the throttle cable and tension of the return spring is needed. Unfortunately when the throttle lever is gripped by the operator's fingers for a long time, the operator's fingers are becomes fatigued.

More particularly, the automatic idle rotation opening restoring type requires fingers to exert strong (highly depressive) holding force on the throttle lever during its normal operation. Thus difficulties with ease of operation arise and in spite of the aformentioned advantage of high safety. This type of apparatus is not appreciated much by the operator and thus, the work machine is hardly equipped with this type of apparatus.

SUMMARY OF THE INVENTION

The present invention contemplates elimination of the above problems. It is therefore an object of the present invention to provide a hand lever apparatus (throttle lever) which has the automatic restoring function (automatic idle rotation opening position restoring function) to cope with an accident and which can perform normal operation lightly and swiftly.

To accomplish the above object, a hand lever apparatus according to the present invention has a rotationally operable operating lever and a toggle mechanism. The operating lever is operated to actuate, through the toggle mechanism, a cable connected to a driven member so as to pull the cable. Preferably, the hand lever apparatus may be used as an operating lever for adjusting the opening of a throttle valve of an internal combustion engine.

In one embodiment of the toggle mechanism, the toggle mechanism includes a swingable connecting link and a slidable connecting link which are rotatably connected to each other at one end of each of the links. The other end of the swingable connecting link is rotatably pivoted, and the other end of the slidable connecting link is slidably movably mounted. The cable is connected to the other end of the slidable connecting link. The toggle mechanism collapses and is moved by pushing a pivotal point common to the swingable connecting link and the slidable connecting link by means of the operating lever.

In the hand lever apparatus of the present invention constructed as above, when the operating lever is gripped by the operator's fingers and is swung in one direction, the operating lever pushes the pivotal point common to the set of connecting links of the toggle mechanism to move the pivotal point upwards. One of the set of connecting links, that is, the swingable connecting link is pivoted and is not allowed to linearly move but a coupler end of the other slidable connecting link is caused to slide forwards. As a result of the forward slide movement of the coupler end, the cable is pulled forwards by a predetermined length and the driven member (throttle valve) is operated to move.

By further swinging the operating lever in the same direction, the set of connecting links constituting the toggle mechanism are arranged substantially straight. Under this condition, the operated movement of the driven member is maximized.

In the event that an accident occurs under this condition and operation is desired to be stopped immediately, the operator's fingers are removed from the operating lever to release it. Through the release operation, the pivotal point of the toggle mechanism moves downwards and the toggle mechanism takes the bent posture. The downward movement causes the coupler end pulling the cable to move rearwards so as to weaken tractive force exerted on the cable, so that the driven member is automatically returned to the intact position and the unacted state is restored.

The tractive movement for the cable is enabled through the toggle mechanism by means of the operating lever in this manner. Hence, the force required for the operation can be mitigated and load imposed on fingers can be reduced. Through to the use of the toggle mechanism, the farther the gripping operation of the operating lever proceeds, the less the force for holding the operating lever in position becomes.

In addition, by releasing the operation of the operating lever, the driven member is automatically restored immediately to the unacted position.

DESCRIPTION OF THE PREFERRED EMBODIMENTS

The present invention will now be described by way of example with reference to the accompanying drawings.

Figure 1:
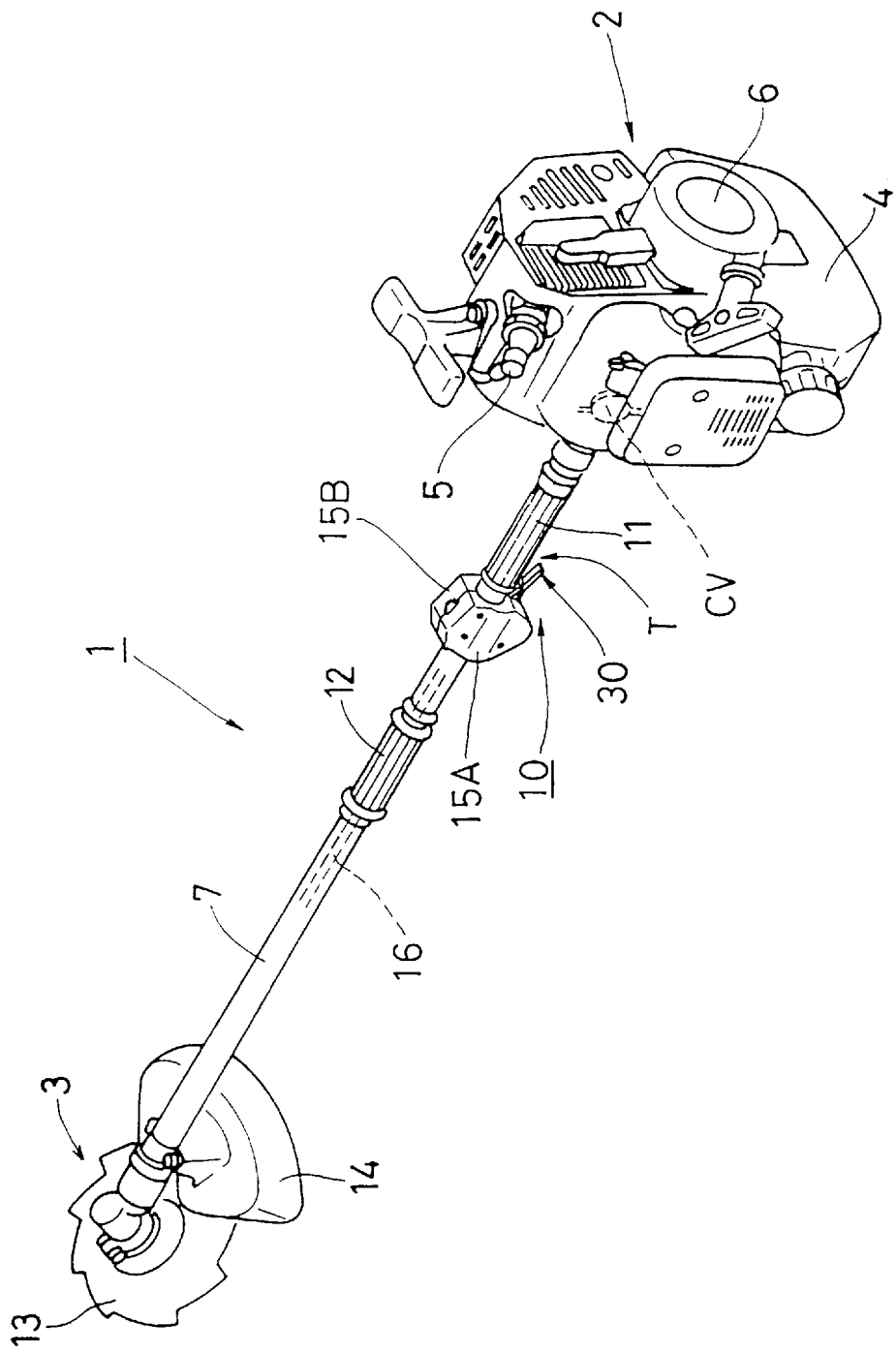
FIG. 1 is a perspective view showing an example of a grass trimmer adopting an embodiment of a hand lever apparatus according to the present invention.

Referring to FIG. 1, there is illustrated an example of a grass trimmer with a hand lever apparatus according to an embodiment of the present invention.

The shown grass trimmer, generally designated by reference numeral 1, comprises a bar handle (operating rod) 7 having grip portions 11 and 12 which are spaced apart at regular intervals. The bar handle 7 has its front end mounted with a working unit 3 including a cutter 13 and a safety cover 14 and has its rear end mounted with an internal combustion engine (small-sized air-cooled two-cycle gasoline engine) 2 serving as a prime mover which drives the cutter 13 through a drive shaft 16 inserted in the bar handle 7. The internal combustion engine 2 is equipped with a recoil starter 6 and a fuel tank 4 and provided with a carburetor having a throttle valve CV, an ignition plug 5 and the like.

Structurally, in the present embodiment, the throttle valve CV of the carburetor is normally biased toward a minimum (idle rotation) opening and when a throttle cable 20 connected to the throttle valve CV as will be described later is pulled from its unacted location by a predetermined length or more to cancel out a play, the opening of the throttle valve CV begins to increase from the minimum (idle rotation) opening.

Of the set of grip portions 11 and 12, the rear grip portion 11 is close to the internal combustion engine 2 and gripped by the right hand. The hand lever apparatus of the present embodiment, generally designated by 10, which is adapted to adjust the opening of the throttle valve CV is mounted to the bar handle 7 near the fore end of the rear grip portion 11.

Figure 2:
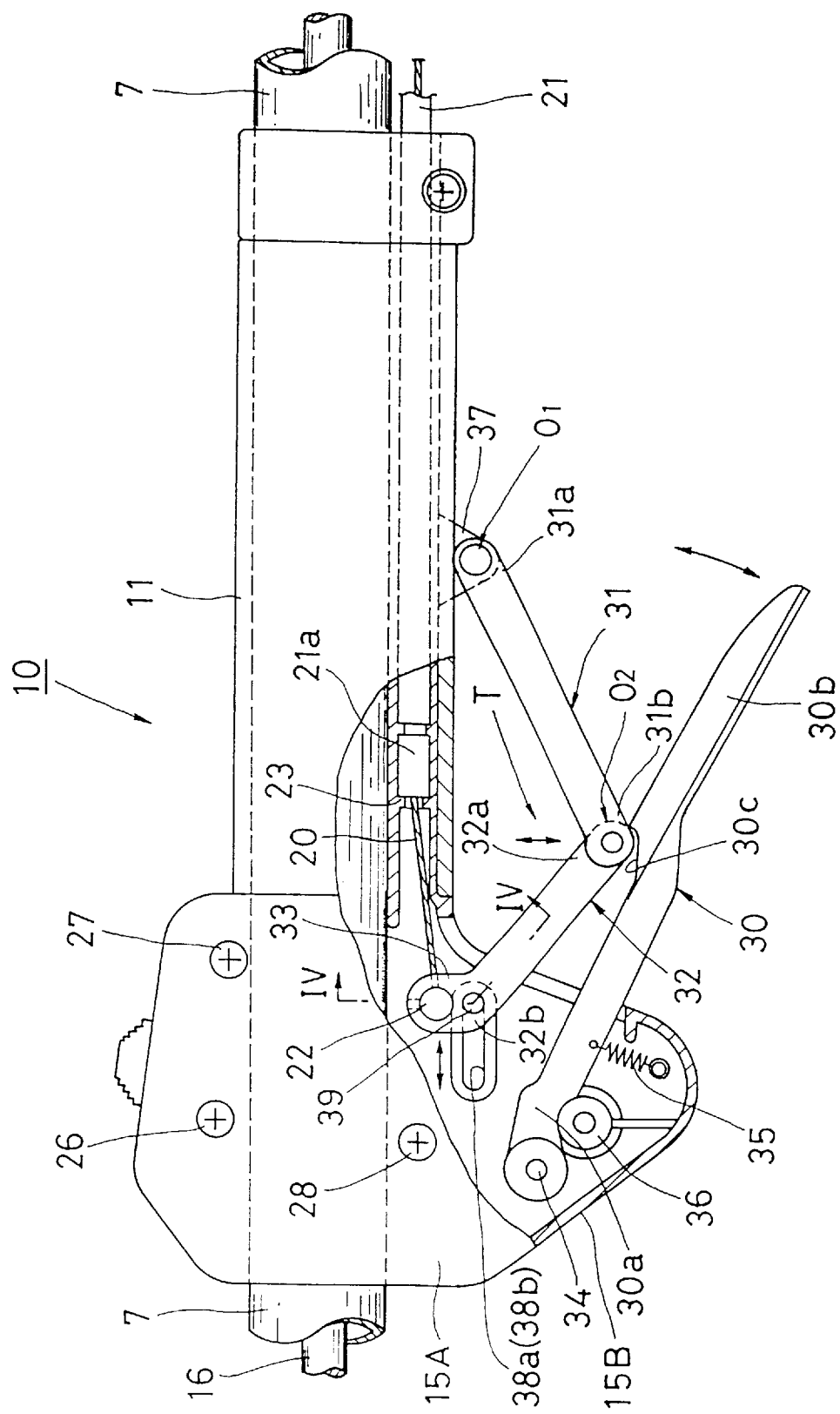
FIG. 2 is a side view showing an unacted state in the embodiment of the hand lever apparatus according to the present invention.
Figure 3:
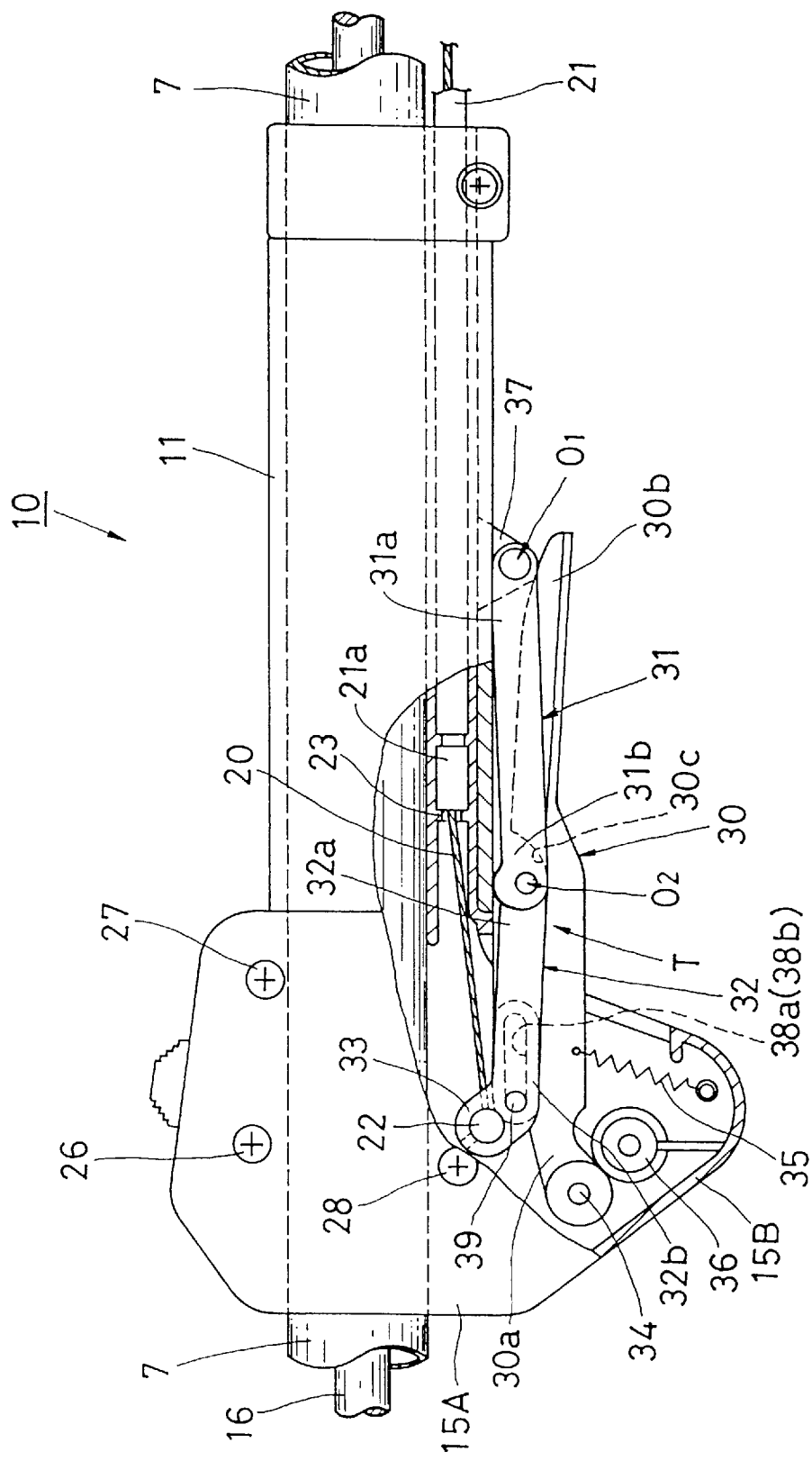
FIG. 3 is a side view showing an acted state of the hand lever apparatus of FIG. 2.
Figure 4:
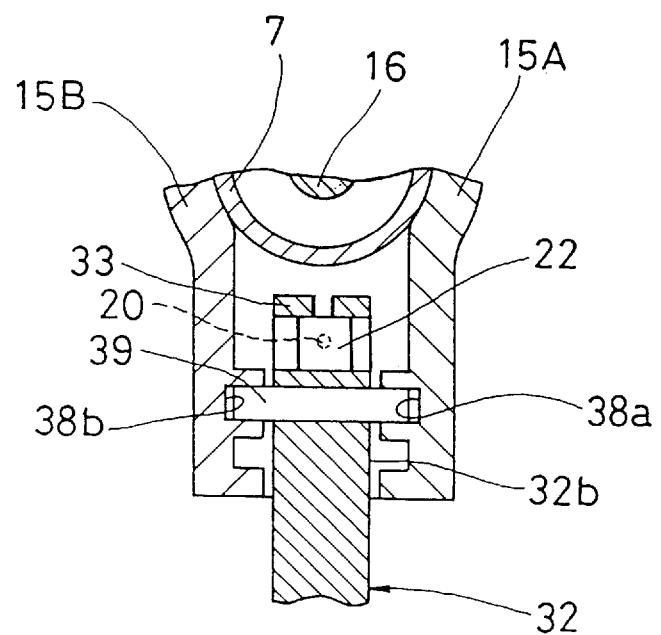
FIG. 4 is a sectional view as seen in arrow IV—IV direction of FIG. 2.

As best seen in FIGS. 2 to 4, the hand lever apparatus 10 of the present embodiment comprises an operating lever 30, a swingable connecting link 31 and a slidable connecting link 32 which constitute a toggle mechanism T operated by the operating lever 30, and split type plate-like cover cases 15A and 15B for rotatably or movably supporting the operating lever 30 and the connecting links 31 and 32. The cover cases 15A and 15B are fixed to the bar handle 7 by means of tightening members (such as sets of screw, nut and washer) 26, 27 and 28 with a portion of bar handle 7 near the fore end of the rear grip portion 11 passing through an upper part of each of the cover cases 15A and 15B.

A front end portion of the throttle cable 20 which is inserted in an outer tube 21 of a Bowden cable and which is connected at its rear end to the throttle valve CV of the internal combustion engine 2 is drawn into the cover cases 15A and 15B, a front end 21a of the outer tube 21 abuts against a stopper 23 provided to an inner lower part of the rear grip portion 11, and the fore end of the throttle cable 20 is coupled to a coupler end 33 of the slidable connecting link 32 by means of a terminal member 22 of the throttle cable 20 snugly fitted in the coupler end 33.

A base end 30a of the operating lever 30 is rotatably mounted on a pin 34 secured to the split type plate-like cover cases 15A and 15B on the interior thereof. The operating lever 30 is slightly biased clockwise by means having a coil spring 35 of weak urging tension so as to normally slightly abut against a stopper 36. The operating lever 30 terminates in the other end serving as a grip 30b, extending obliquely downwards toward the rear part of the bar handle 7.

One of the set of connecting links 31 and 32 constitutes part of the toggle mechanism T. That is, the swingable connecting link 31 has its base end 31a swingably pivoted, at a pivotal point $O_1$, to a lug 37 located intermediately of the rear grip portion 11 and has its swingable end 31b pivotally connected, at a pivotal point $O_2$, to a swingable end 32a of the slidable connecting link 32. Inserted in a slide end 32b of the slidable connecting link 32 is a slide pin 39 which is slidable in a set of left and right elongated guide grooves 38a and 38b formed in inner walls of the split type plate-like cover cases 15A and 15B.

The pivoting point $O_2$ common to the set of the connecting links 31 and 32 constituting the toggle mechanism T is arranged to engage a recess 30c formed at an intermediate portion of the operating lever 30 and is normally biased by tension of the throttle cable 20 so as to be led downwards until it is brought into slight engagement to the recess 30c of the operating lever 30.

The operation of the hand lever apparatus 10 of the present embodiment constructed as above will now be described.

With the operating lever 30 conditioned as shown in FIG. 2, the internal combustion engine 2 is started to operate under the idle condition, that is, at the minimum opening (idle rotation opening) of the throttle valve CV of the internal combustion engine 2. Thereafter, the grip 30b of the operating lever 30 of the hand lever apparatus 10 is gripped by fingers, causing the operating lever 30 to rotate counterclockwise about the pin 34 serving as a pivotal point. As a result of the rotation, the recess 30c of the operating lever 30 pushes the pivotal point $O_2$ common to the set of the connecting links 31 and 32 upwards. Of the set of the connecting links 31 and 32, the swingable connecting link 31 has the base end 31a which is pivoted at the pivotal point $O_1$ so as not to be allowed for linear movement. The coupler end 33 of the slidable connecting link 32 is slid forwards (toward the cutter 13) along the set of the elongated guide grooves 38a and 38b of the cover cases 15A and 15B. As a result of the forward sliding movement of the coupler end 33, the throttle cable 20 is pulled forwards by a predetermined length to cause the throttle valve CV of the internal combustion engine 2 to move from the minimum opening (idle rotation opening) to a larger opening.

When the operating lever 30 is further rotated counterclockwise so as to be moved to a position as shown in FIG. 3, the set of the connecting links 31 and 32 constituting the toggle mechanism T postures substantially straight immediately before a dead point. Under this condition, the opening of the throttle valve CV of the internal combustion engine 2 is maximized to deliver the normal maximum output of the internal combustion engine 2 and an operation such as trimming is carried out.

When the normal operation is desired to be stopped or in the event that an accident occurs and the rotational speed of the internal combustion engine 2 is desired to be decreased immediately to a great extent to permit the idle operation, the operating lever 30 is released by removing the operator's fingers therefrom. Through the release operation, the pivotal point $O_2$ of the toggle mechanism T is moved downwards by return urging force normally exerted on the throttle cable 20 to posture the toggle mechanism T as shown in FIG. 2. Since the above movement causes the coupler end 33 pulling the throttle cable 20 to move rearwards (toward the internal combustion engine 2) to thereby weaken the tractive force for the throttle cable 20, the throttle valve CV returns to the minimum opening and the internal combustion engine 2 is conditioned to the idle rotation.

Since, in the grass trimmer 1 of the present embodiment, the rotary driving force of the internal combustion engine 2 is transmitted to the working unit 3 including of the cutter 13 through a centrifugal clutch not shown, the centrifugal clutch is automatically cut off to stop transmission of power to the working unit 3 and the driving of the cutter 13 and the like is immediately stopped.

As described above, in the present embodiment, tractive movement of the throttle cable 20 is actuated through the toggle mechanism T by means of the operating lever 30 swingable about the single pivotal point 34 and therefore, force required for the actuation can be mitigated to reduce the load imposed on the operator's fingers. Through to the use of the toggle mechanism T, the more the operating lever 30 approaches the state of FIG. 3, the less the force for holding the operating lever 30 in position becomes.

In the state of FIG. 3 in which the maximum tractive force is applied to the throttle cable 20, the set of the connecting links 31 and 32 postures substantially straight and the slidable connecting link 32 having the coupler end 33 connecting to the throttle cable 20 has completed a counterclockwise rotation in the course of forward slide movement of the slidable connecting link 32 along the set of the elongated guide grooves 38a and 38b, with the result that force required for fingers to grip the operating lever 30 so as to keep it held in the state of FIG. 3 can advantageously mitigated. Even when the operating lever 30 is gripped by the operator's fingers under the condition of FIG. 3 for a long time during working, the fingers are less loaded and less fatigued.

One embodiment of the present invention has been set forth so far in detail but the present invention is in no way limited to the foregoing embodiment and can be changed in design in various ways without departing from the spirit of the present invention as recited in the appended claims.

For example, while the hand lever apparatus of the present invention is described, in the foregoing embodiment, as being adapted for adjustment of the opening of the internal combustion engine throttle valve of the work machine, the foregoing embodiment is not limitative and obviously, the hand lever apparatus can be widely utilized to act as an operating lever of another apparatus with a handle.

In the foregoing embodiment, the hand lever apparatus is attached to the bar handle but obviously it may also be attached to a handle of other type than the bar handle, for example, a U-shaped handle.

As can be seen from the foregoing description, in the hand lever apparatus of the present invention, the toggle mechanism is interposed between the operating lever and the cable standing for an object to be operated. The cable is actuated by the operating lever through the toggle mechanism, so that the operating lever can be actuated lightly and the operator can grip the operating lever with his/her fingers for a long time with less fatigue and can be allowed to hold the operating lever in position with ease.

When the hand lever apparatus is used as an operating mechanism for opening the throttle valve of the internal combustion engine, the throttle valve can be returned immediately to the minimum opening (idle rotation) position by removing the operator's fingers from the operating lever, thus ensuring high safety.

What is claimed is:

1. An apparatus comprising:

a rotationally operable operating lever; and a toggle mechanism;

wherein said operating lever is operated to actuate, through said toggle mechanism, a cable connected to a driven member so as to pull said cable;

said toggle mechanism includes a swingable connecting link and a slidable connecting link which are rotatable connected to each other at one end of each of said links;

the other end of said swingable connecting link is rotatably pivoted;

the other end of said slidable connecting link is slidably movably mounted and said cable is connected to the other end of said slidable connecting link; and said toggle mechanism is collapsed and moved by pushing a pivotal point common to said swingable connecting link and said slidable connecting link by means of said operating lever so as to slide the other end of said slidable connecting link away from the other end of said swingable connecting link.

2. An apparatus according to claim 1, wherein said driven member is a throttle valve of an internal combustion engine.

3. An apparatus according to claim 1, wherein a biasing member is coupled to said operating lever so as to resist said toggle mechanism from collapsing.

* * * * *